(12) United States Patent
Chou et al.

(10) Patent No.: US 12,013,514 B2
(45) Date of Patent: Jun. 18, 2024

(54) IMAGING LENS ASSEMBLY, CAMERA MODULE AND ELECTRONIC DEVICE

(71) Applicant: LARGAN PRECISION CO., LTD., Taichung (TW)

(72) Inventors: Ming-Ta Chou, Taichung (TW); Ruei-Yang Luo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 361 days.

(21) Appl. No.: 17/553,988

(22) Filed: Dec. 17, 2021

(65) Prior Publication Data

US 2022/0107483 A1 Apr. 7, 2022

Related U.S. Application Data

(63) Continuation of application No. 16/505,926, filed on Jul. 9, 2019, now Pat. No. 11,237,361.

(30) Foreign Application Priority Data

Oct. 24, 2018 (TW) .................................. 107214451

(51) Int. Cl.
*G02B 7/02* (2021.01)
*G02B 7/00* (2021.01)
*G02B 13/00* (2006.01)
*H04N 23/55* (2023.01)

(52) U.S. Cl.
CPC ......... *G02B 13/0035* (2013.01); *G02B 7/003* (2013.01); *G02B 7/021* (2013.01); *G02B 7/026* (2013.01); *H04N 23/55* (2023.01)

(58) Field of Classification Search
CPC .... G02B 13/0035; G02B 7/003; G02B 7/021; G02B 7/026; G02B 13/001; G02B 7/022; G02B 7/00; G02B 7/02; H04N 5/2254; H04N 23/55; G02F 13/00
See application file for complete search history.

(56) References Cited

U.S. PATENT DOCUMENTS

| | | | |
|---|---|---|---|
| 8,967,814 B2 | 3/2015 | Chang | |
| 8,985,789 B2 | 3/2015 | Cho et al. | |
| 9,341,813 B1 | 5/2016 | Lin et al. | |
| 9,395,517 B2* | 7/2016 | Um | G02B 13/0085 |
| 9,513,454 B2* | 12/2016 | Lin | G02B 7/021 |
| 9,823,544 B2 | 11/2017 | McIntyre et al. | |
| 9,874,715 B1 | 1/2018 | Ma et al. | |

(Continued)

*Primary Examiner* — Balram T Parbadia
(74) *Attorney, Agent, or Firm* — McClure, Qualey & Rodack, LLP

(57) ABSTRACT

An imaging lens assembly includes lens elements, a metal spacing structure and at least one blocking sheet. At least one lens element is a plastic lens element. The metal spacing structure is for maintaining the plastic lens element in a space between two sides thereof and two of the lens elements adjacent thereto, respectively. The metal spacing structure includes, in order from an object side to an image side, a first spacing ring having a first through hole and a second spacing ring having a second through hole, wherein the second through hole is larger than the first through hole. At least one of the first spacing ring and the second spacing ring is made of metal material. The blocking sheet is disposed between two of the lens elements, and is not disposed between the first spacing ring and the second spacing ring.

13 Claims, 16 Drawing Sheets

(56) References Cited

U.S. PATENT DOCUMENTS

| | | |
|---|---|---|
| 9,904,031 B2 | 2/2018 | Yang |
| 2004/0125470 A1 | 7/2004 | Chiang |
| 2008/0084619 A1 | 4/2008 | Lee |
| 2009/0080094 A1 | 3/2009 | Chen |
| 2010/0073531 A1 | 3/2010 | Yano et al. |
| 2010/0073532 A1 | 3/2010 | Yano et al. |
| 2011/0085070 A1 | 4/2011 | Kang et al. |
| 2012/0147489 A1 | 6/2012 | Matsuoka |
| 2012/0194923 A1 | 8/2012 | Um |
| 2012/0314288 A1 | 12/2012 | Lai |
| 2013/0003199 A1 | 1/2013 | Jeong et al. |
| 2013/0033751 A1 | 2/2013 | Lai et al. |
| 2014/0160581 A1 | 6/2014 | Cho et al. |
| 2015/0022896 A1 | 1/2015 | Cho et al. |
| 2016/0161702 A1 | 6/2016 | Yang |
| 2016/0349504 A1 | 12/2016 | Kim et al. |
| 2019/0049689 A1* | 2/2019 | Lin .................... G02B 13/0045 |

\* cited by examiner

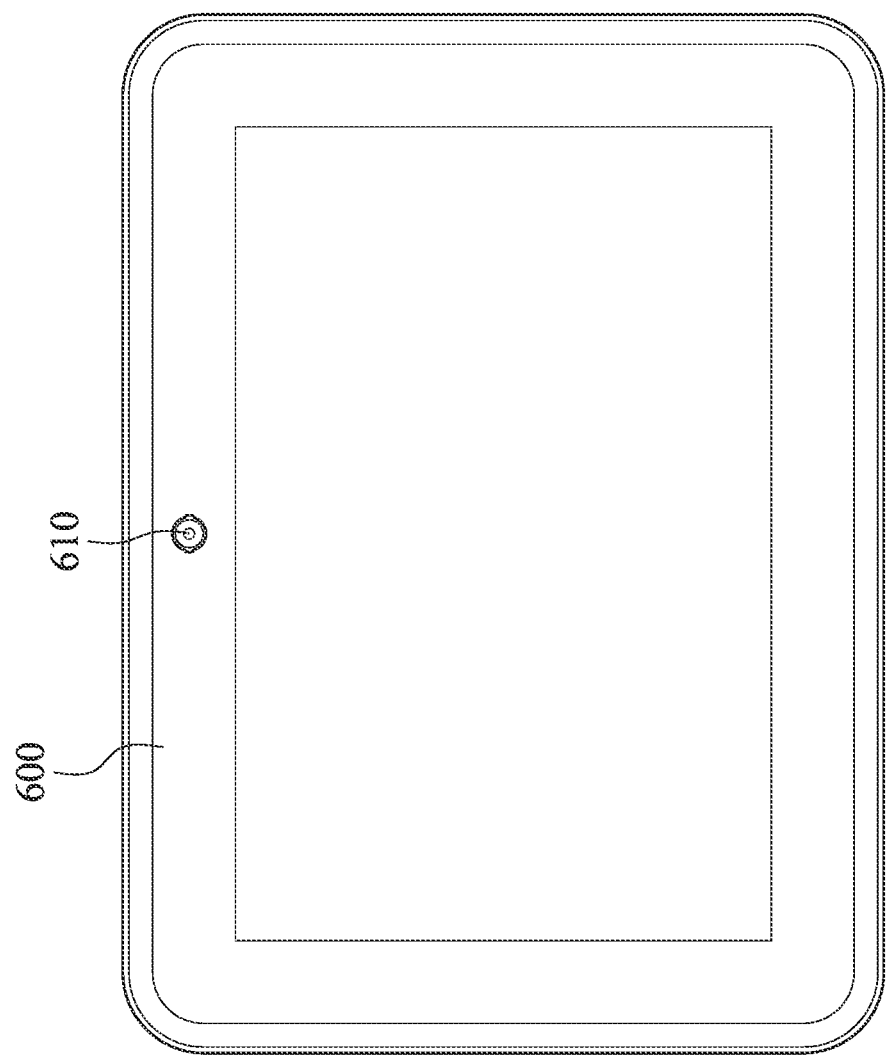

IMAGING LENS ASSEMBLY, CAMERA MODULE AND ELECTRONIC DEVICE

RELATED APPLICATIONS

The present application is a continuation of the application Ser. No. 16/505,926, filed Jul. 9, 2019, which claims priority to Taiwan Application Serial Number 107214451, filed Oct. 24, 2018, which is herein incorporated by reference.

BACKGROUND

Technical Field

The present disclosure relates to an imaging lens assembly and a camera module. More particularly, the present disclosure relates to an imaging lens assembly and a camera module applicable to portable electronic devices.

Description of Related Art

In recent years, portable electronic devices have been developed rapidly, such as smart devices, tablets and so on. These portable electronic devices have been full of daily lives of modern people, and the camera module loaded on the portable electronic devices thrives on it. The demand for quality of the camera module increases along with the advances in technology. Therefore, the camera module needs to be improved not only on the quality of the optical design but manufacturing assembling precision.

The imaging lens assembly in the camera module is mainly composed of a plurality of lens elements and optical elements. However, in the manufacturing process, the structure of the lens element or the optical element is easily damaged due to the assembling force so as to affect the manufacturing yield and image quality of the imaging lens assembly.

SUMMARY

According to one aspect of the present disclosure, an imaging lens assembly includes a plurality of lens elements, a metal spacing structure, and at least one blocking sheet. At least one of the lens elements is a plastic lens element. The metal spacing structure is for maintaining the plastic lens element in a space between two sides thereof and two of the lens elements adjacent thereto, respectively. The metal spacing structure includes, in order from an object side to an image side, a first spacing ring and a second spacing ring. The first spacing ring has a first through hole, and a second spacing ring has a second through hole, wherein the second through hole is larger than the first through hole. At least one of the first spacing ring and the second spacing ring is made of metal material. At least one blocking sheet is disposed between two of the lens elements, wherein all of the at least one blocking sheet is not disposed between the first spacing ring and the second spacing ring of the metal spacing structure. When a thickness of the first spacing ring is t1, and a distance between the first spacing ring and the second spacing ring is d, the following condition is satisfied: $0.1 < t1/d < 2.0$.

According to another aspect of the present disclosure, a camera module includes the imaging lens assembly of the aforementioned aspect.

According to another aspect of the present disclosure, an electronic device includes the camera module of the aforementioned aspect and an image sensor, wherein the image sensor is disposed on an image surface of the imaging lens assembly of the camera module.

BRIEF DESCRIPTION OF THE DRAWINGS

The present disclosure can be more fully understood by reading the following detailed description of the embodiment, with reference made to the accompanying drawings as follows:

FIG. 6 is a schematic view of an electronic device according to the 6th embodiment of the present disclosure.

DETAILED DESCRIPTION

Figure 1A:
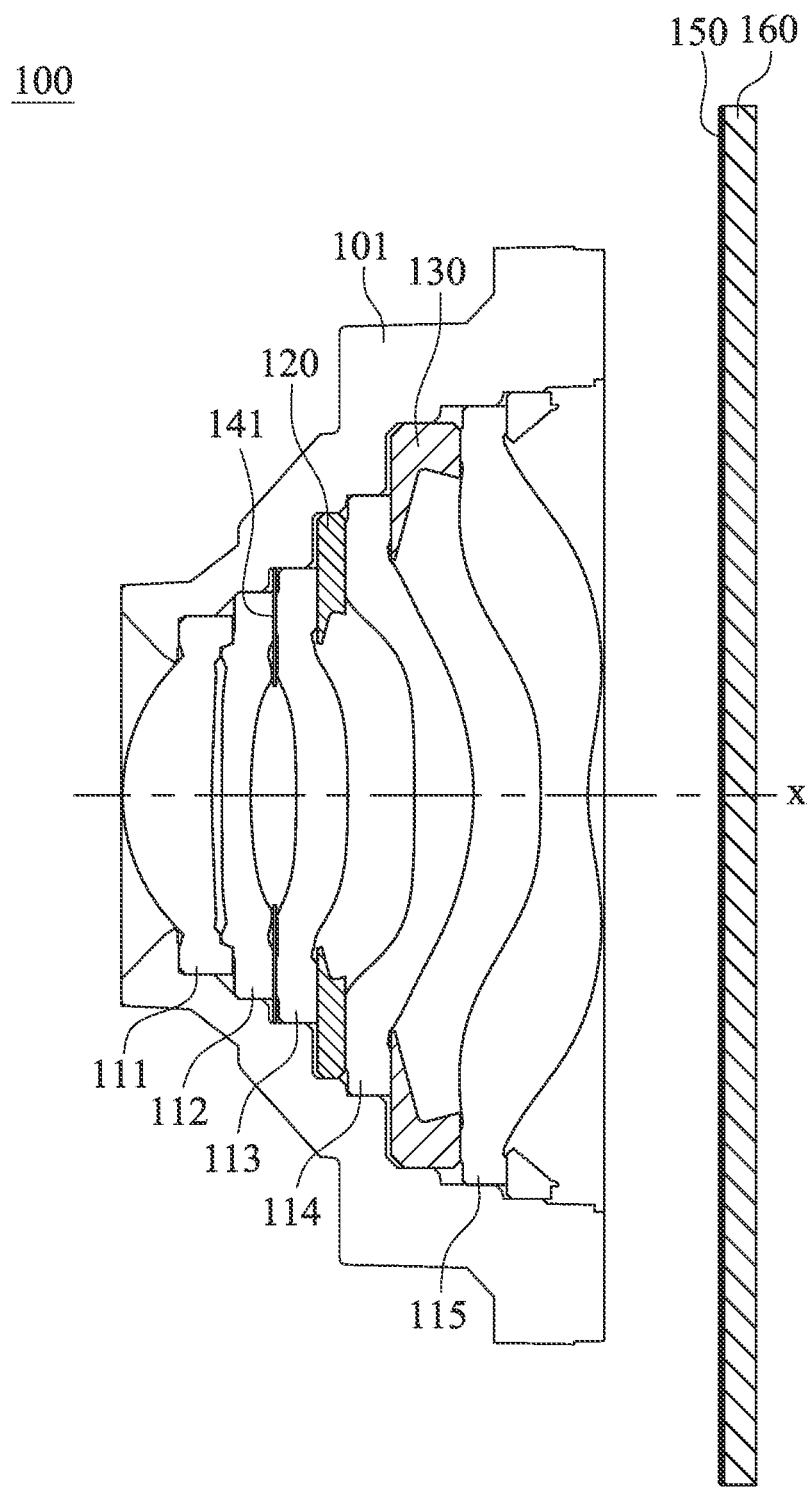
FIG. 1A is a schematic view of an electronic device according to the 1st embodiment of the present disclosure.

The present disclosure provides an imaging lens assembly, which includes a plurality of lens elements, a metal spacing structure and at least one blocking sheet. At least one of the lens elements is a plastic lens element. The metal spacing structure is for maintaining the plastic lens element in a space between two sides thereof and two of the lens elements adjacent thereto, respectively, and the metal spacing structure includes, in order from an object side to an image side, a first spacing ring and a second spacing ring. The first spacing ring has a first through hole, and the second spacing ring has a second through hole, wherein the second through hole is larger than the first through hole, and at least one of the first spacing ring and the second spacing ring is made of metal material. At least one blocking sheet is disposed between two of the lens elements, and all of the at least one blocking sheet is not disposed between the first spacing ring and the second spacing ring of the metal spacing structure. Therefore, it is favorable for providing a suitable and stable spacing between the plastic lens element and the adjacent lens elements thereof via the metal spacing structure so as to achieve expected resolution for the imaging lens assembly. Furthermore, it is favorable for protecting the imaging lens assembly with specific arrangement for passing the test of assembling process and quality stability via the metal material which can significantly resist the assembling force in the manufacturing process of the imaging lens assembly.

When a thickness of the first spacing ring is t1, and a distance between the first spacing ring and the second spacing ring is d, the following condition is satisfied: $0.1<t1/d<2.0$. If the thickness of the first spacing ring is too thin, the cost would be increased for strengthening a hardness of the first spacing ring; if the thickness of the first spacing ring is too thick, the manufacturing tolerance would be easily generated and unnecessary space between the lens elements would be increased that will affect the resolution of the imaging lens assembly. Therefore, it is favorable for effectively controlling the manufacturing cost and obtaining good resolution by maintaining t1/d in a specific range. Moreover, the following condition can be satisfied: $0.1<t1/d<1.3$. Therefore, a better thickness ratio can be further provided for avoiding the lens elements from being crushed due to the thickness thereof being too thin by evenly sharing the assembly force and avoiding the first spacing ring from being deformed by extrusion due to the thickness thereof being too thin.

The first spacing ring can be made of metal material and an appearance of the first spacing ring can be black. It is favorable for providing the plastic lens element with the stable and not easily deformed optical interval by arranging the first spacing ring with a metal material which can adaptively match the excessive change of the outer diameters of different lens elements. In detail, when the plastic lens element is subjected to a resistance point and a point of application which are too far apart from each other, the distortion is easily generated, thus the first spacing ring made of metal material can eliminate the aforementioned distortion, and it is favorable for resisting the pressing force between the lens elements during assembling without deformation so as to maintain necessary and high precise of the space between the lens elements. Furthermore, it is favorable for reducing reflections of unnecessary stray light via the black appearance of the first spacing ring.

A cross section of an inner annular surface of the first spacing ring can be a V-shaped groove which is tapered in a direction from a position close to the first through hole to a position away from the first through hole, wherein the inner annular surface of the first spacing ring is a surface close to the first through hole and surrounding the first through hole. By the arrangement of the V-shaped groove, it is favorable for effectively avoiding the reflection of unnecessary light on the image surface.

When a thickness of the second spacing ring is t2, and the distance between the first spacing ring and the second spacing ring is d, the following condition is satisfied: $0.5<t2/d<2.0$. Therefore, a better thickness ratio can be further provided, which is favorable for avoiding lens elements from being crushed due to the thickness thereof being too thin by sharing the assembling force evenly and avoiding the second spacing ring from being deformed by extrusion due to the thickness thereof being too thin.

An outer diameter of the first spacing ring, an outer diameter of the plastic lens element and an outer diameter of the second spacing ring can be different, and the outer diameter of the second spacing ring can be larger than the outer diameter of the first spacing ring and the outer diameter of the plastic lens element, the outer diameter of the plastic lens element can be larger than the outer diameter of the first spacing ring. It is favorable for avoiding excessive concentration of the pressing force on the plastic lens element by evenly pressing the force on the first spacing ring, the plastic lens element and the second spacing ring, so as to protect the plastic lens element.

The at least one blocking sheet can be disposed on an object side of the first spacing ring and is not directly contacted with the first spacing ring. Therefore, it is favorable for avoiding the blocking sheet from being damaged by the extrusion of the metal spacing structure, and it is favorable for covering more surface reflection inside the imaging lens assembly by the arrangement of the position of the blocking sheet, so as to improve the overall image quality.

The second spacing ring can include a metal material portion, wherein the metal material portion surrounds the second through hole, and the metal material portion of the second spacing ring is directly contacted with the plastic lens element for maintaining the space between one of the two sides of the plastic lens element and one of the two lens elements adjacent to the side which is an image side of the plastic lens element. Therefore, it is favorable for maintaining high precision of the space between the lens elements from one to three lens elements by further extending the range for stabling the space between the lens elements providing by the second spacing ring.

The second spacing ring can further include a plastic material portion which surrounds the second through hole, an appearance of the plastic material portion is black, and the plastic material portion is closer to the second through hole than the metal material portion is thereto. Therefore, it is favorable for effectively controlling the roughness of the surface of the second spacing ring and further reducing the reflected light by adjusting the surface property of the second spacing ring through the plastic material portion.

The metal material portion can be embedded in the plastic material portion by an insert molding method. Therefore, it is favorable for adjusting the dimensional accuracy of the second spacing ring by the injection molding die of the plastic material portion, so as to correct the larger dimensional tolerances in the metal material portion for increasing production efficiency, and a desired characteristic of stable supporting of the second spacing ring can be provided via the metal material portion.

Moreover, both of the first spacing ring and the second spacing ring can be made of metal material and the appearances thereof can be black. Therefore, it is favorable for providing more shielding to the plastic lens element by forming a groove structure from the first spacing ring and the second spacing ring, so as to reduce the chance of the internal reflection formed by unnecessary reflected light in the plastic lens element.

A cross section of the inner annular surface of the second spacing ring can be a V-shaped groove which is tapered in a direction from a position close to the second through hole to a position away from the second through hole, wherein the inner annular surface of the second spacing ring is a surface that is adjacent to the second through hole and surrounds the second through hole. By the arrangement of the V-shaped groove, it is favorable for effectively avoiding the reflection of unnecessary light on the image surface.

A minimum inner diameter of the second through hole can be larger than an outer diameter of one of the lens elements closest to the object side of the imaging lens assembly. Therefore, it is favorable for avoiding the assembled lens elements on the object side of the imaging lens assembly to be affected by the assembling process on an image side thereof.

A minimum inner diameter of the second through hole is larger than each of outer diameters of the lens elements on an object side of the first spacing ring. Therefore, it is favorable for avoiding the assembled lens elements on the object side of the imaging lens assembly to be affected by the assembling process of the metal spacing structure and the imaging lens assembly be assembled by larges pressing force on demand.

Each of the aforementioned features of the imaging lens assembly can be utilized in various combinations for achieving the corresponding effects.

The present disclosure further provides a camera module, which includes the aforementioned imaging lens assembly. Therefore, yield rate and image quality of the camera module can be increased.

The present disclosure further provides an electronic device, which includes the aforementioned camera module and an image sensor, wherein the image sensor is disposed on an image surface of the imaging lens assembly of the camera module. Therefore, the electronic device with both image quality and assembling yield rate can be provided.

1st Embodiment

Figure 1B:
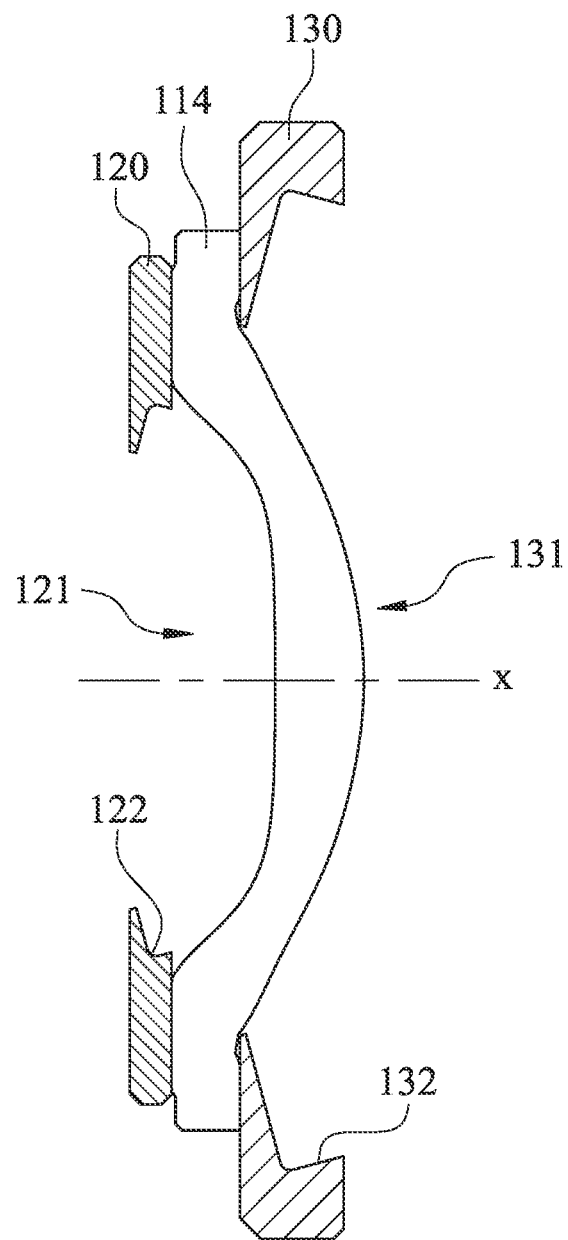
FIG. 1B is a schematic view of a first spacing ring and a second spacing ring according to the 1st embodiment of FIG. 1A.

FIG. 1A is a schematic view of an electronic device 100 according to the 1st embodiment of the present disclosure. FIG. 1B is a schematic view of a first spacing ring 120 and a second spacing ring 130 according to the 1st embodiment of FIG. 1A. FIG. 10 is a schematic view of the parameters t1, t2 and d according to the 1st embodiment of FIG. 1A. In FIGS. 1A, 1B and 10, the electronic device 100 includes a camera module (its reference numeral is omitted) and an image sensor 160, wherein the camera module includes a lens barrel 101, and an imaging lens assembly (its reference numeral is omitted). The image sensor 160 is disposed on an image surface 150 of the imaging lens assembly.

In detail, the imaging lens assembly includes a plurality of lens elements, a metal spacing structure (its reference numeral is omitted), a blocking sheet 141 and an image surface 150, wherein the lens elements, the metal spacing structure, and the blocking sheet 141 are disposed in the lens barrel 101, and the image surface 150 is disposed on an image side of the lens barrel 101.

In the 1st embodiment of FIG. 1A, the lens elements are, in order from the object side to the image side, a first lens element 111, a second lens element 112, a third lens element 113, a plastic lens element 114, and a fifth lens element 115. The metal spacing structure is for maintaining a space between the plastic lens element 114 and the two lens elements adjacent to two sides thereof (that is, the third lens element 113 and the fifth lens element 115).

The metal spacing structure includes, in order from the object side to the image side, the first spacing ring 120 and the second spacing ring 130; that is, it is favorable for maintaining a space between the plastic lens element 114 and the adjacent third lens element 113 by the arrangement of the first spacing ring 120, and is favorable for maintaining a space between the plastic lens element 114 and the adjacent fifth lens element 115 by the arrangement of the second spacing ring 130. In FIG. 1B, the first spacing ring 120 has a first through hole 121, and the second spacing ring 130 has a second through hole 131, wherein the second through hole 131 is larger than the first through hole 121, and the first spacing ring 120 and the second spacing ring 130 are made of metal material and the appearances thereof are black.

The blocking sheet 141 is disposed between two of the lens elements (that is, the second lens element 112 and the third lens element 113), and all of the at least one blocking sheet 141 is not disposed between the first spacing ring 120 and the second spacing ring 130 of the metal spacing structure. In detail, according to the 1st embodiment, the blocking sheet 141 is disposed on the object side of the first spacing ring 120 and is not directly contacted with the first spacing ring 120.

A cross section of the inner annular surface of the first spacing ring 120 has a V-shaped groove 122 which is tapered in a direction from a position close to the first through hole 121 to a position away from the first through hole 121. A cross section of the inner annular surface of the second spacing ring 130 has a V-shaped groove 132 which is tapered in a direction from a position close to the second through hole 131 to a position away from the second through hole 131.

Further, in FIG. 1B, an outer diameter of the first spacing ring 120, an outer diameter of the plastic lens element 114 and an outer diameter of the second spacing ring 130 are different and the outer diameter of the second spacing ring 130 is larger than the outer diameter of the first spacing ring 120 and the outer diameter of the plastic lens element 114, and the outer diameter of the plastic lens element 114 is larger than the outer diameter of the first spacing ring 120. In FIG. 10, a minimum inner diameter Dmin of the second through hole 131 is larger than an outer diameter of one of the lens elements closest to the object side of the imaging lens assembly. That is, in the 1st embodiment, the minimum inner diameter Dmin of the second through hole 131 is larger than the outer diameter of the first lens element 111. The minimum inner diameter Dmin of the second through hole 131 is larger than each of outer diameters of the lens elements on the object side of the first spacing ring 120. That is, in the 1st embodiment, the minimum inner diameter Dmin of the second through hole 131 is larger than the outer diameter of the first lens element 111, an outer diameter of the second lens element 112 and an outer diameter of the third lens element 113.

Figure 1C:
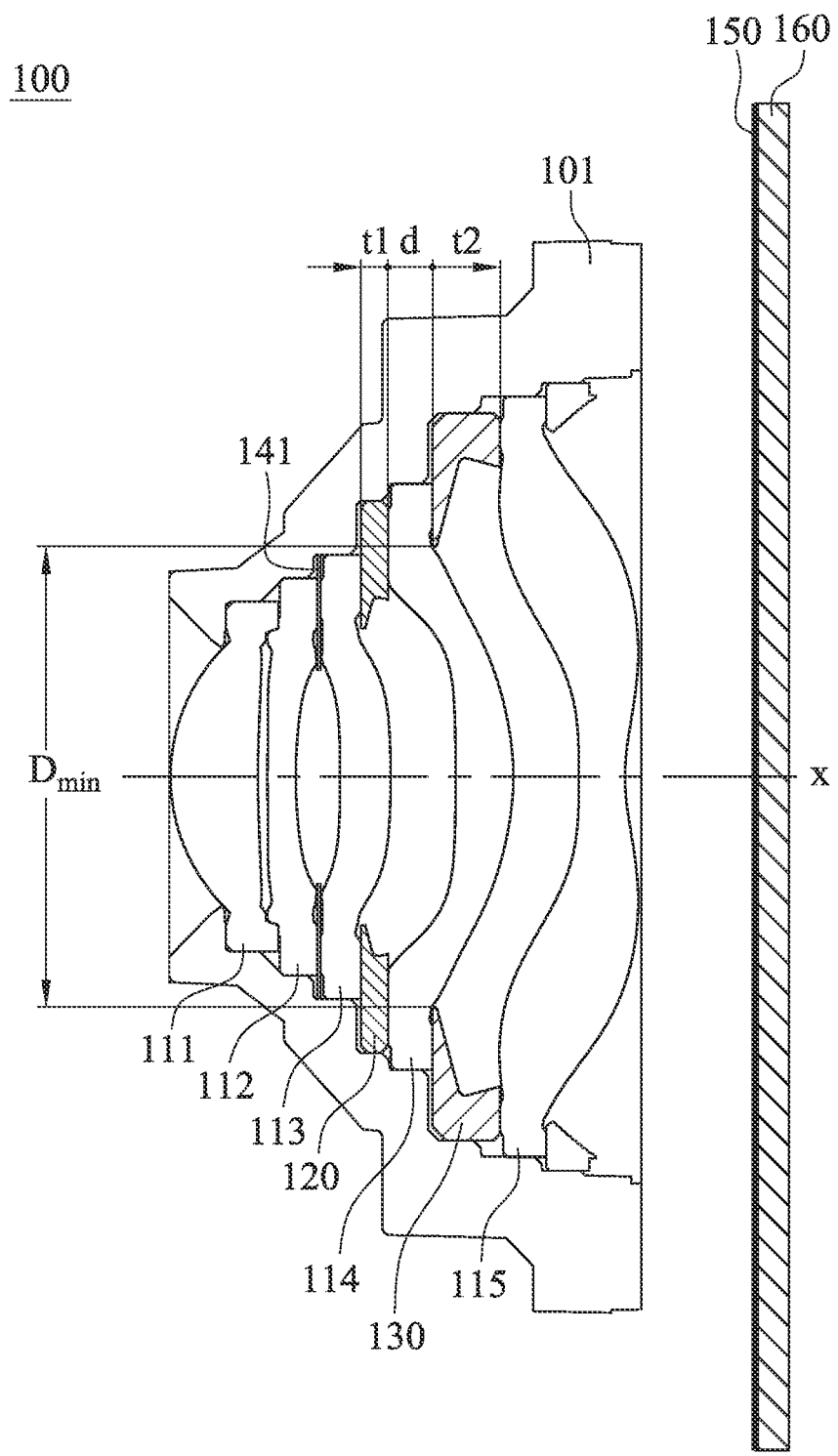
FIG. 1O is a schematic view of parameters t1, t2, and d according to the 1st embodiment of FIG. 1A.

In FIG. 1C, when a thickness of the first spacing ring 120 is t1 (that is, the thickness of the first spacing ring 120 parallel to an optical axis X), a thickness of the second spacing ring 130 is t2 (that is, the thickness of the second spacing ring 130 parallel to the optical axis X), and a distance between the first spacing ring 120 and the second spacing ring 130 is d (that is, the distance between the first spacing ring 120 and the second spacing ring 130 parallel to the optical axis X), the following conditions of the Table 1 are satisfied:

TABLE 1

| 1st embodiment | | | |
|---|---|---|---|
| t1 (mm) | 0.2 | t1/d | 0.61 |
| t2 (mm) | 0.5 | t2/d | 1.52 |
| d (mm) | 0.33 | | |

2nd Embodiment

Figure 2A:
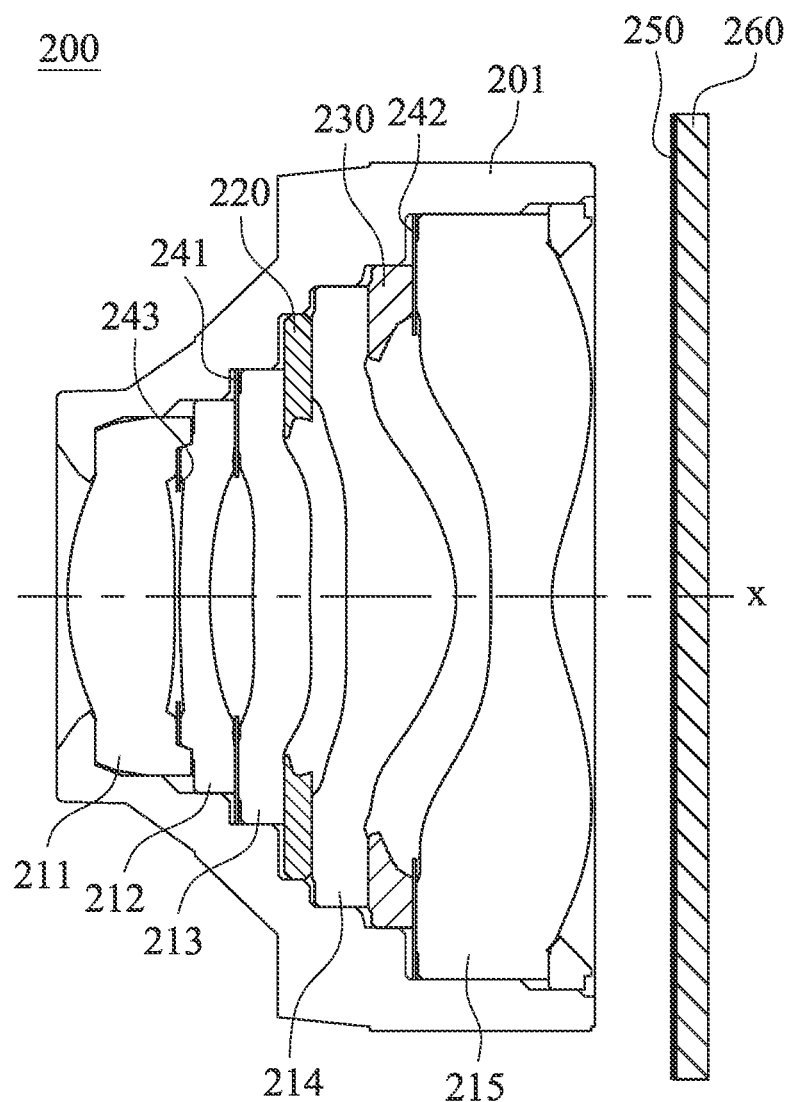
FIG. 2A is a schematic view of an electronic device according to the 2nd embodiment of the present disclosure.

FIG. 2A is a schematic view of an electronic device 200 according to the 2nd embodiment of the present disclosure.

Figure 2B:
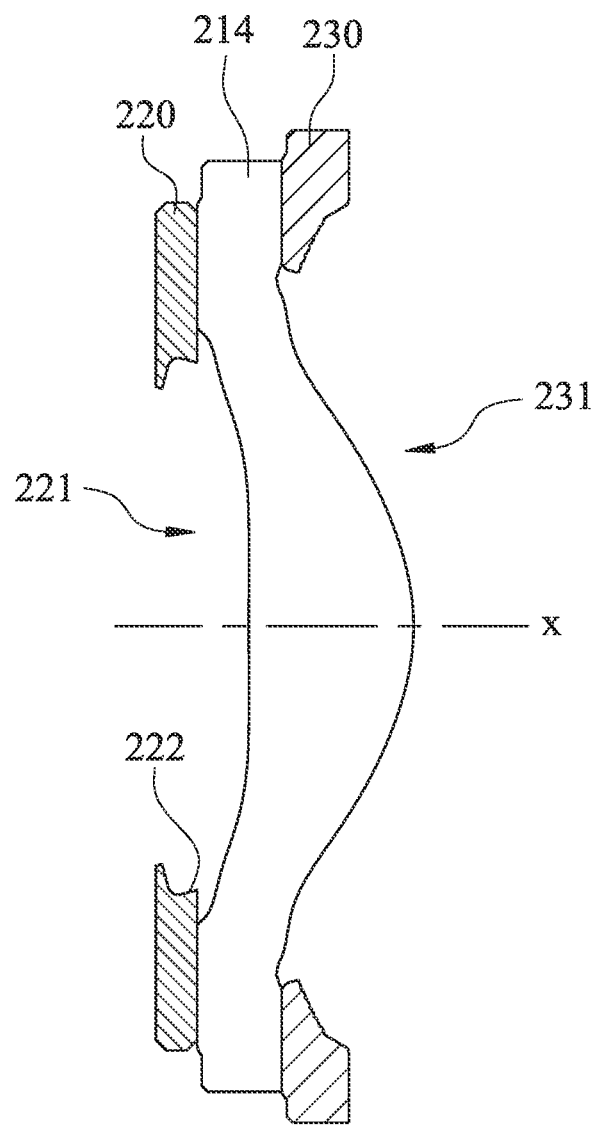
FIG. 2B is a schematic view of a first spacing ring and a second spacing ring according to the 2nd embodiment of FIG. 2A.
Figure 2C:
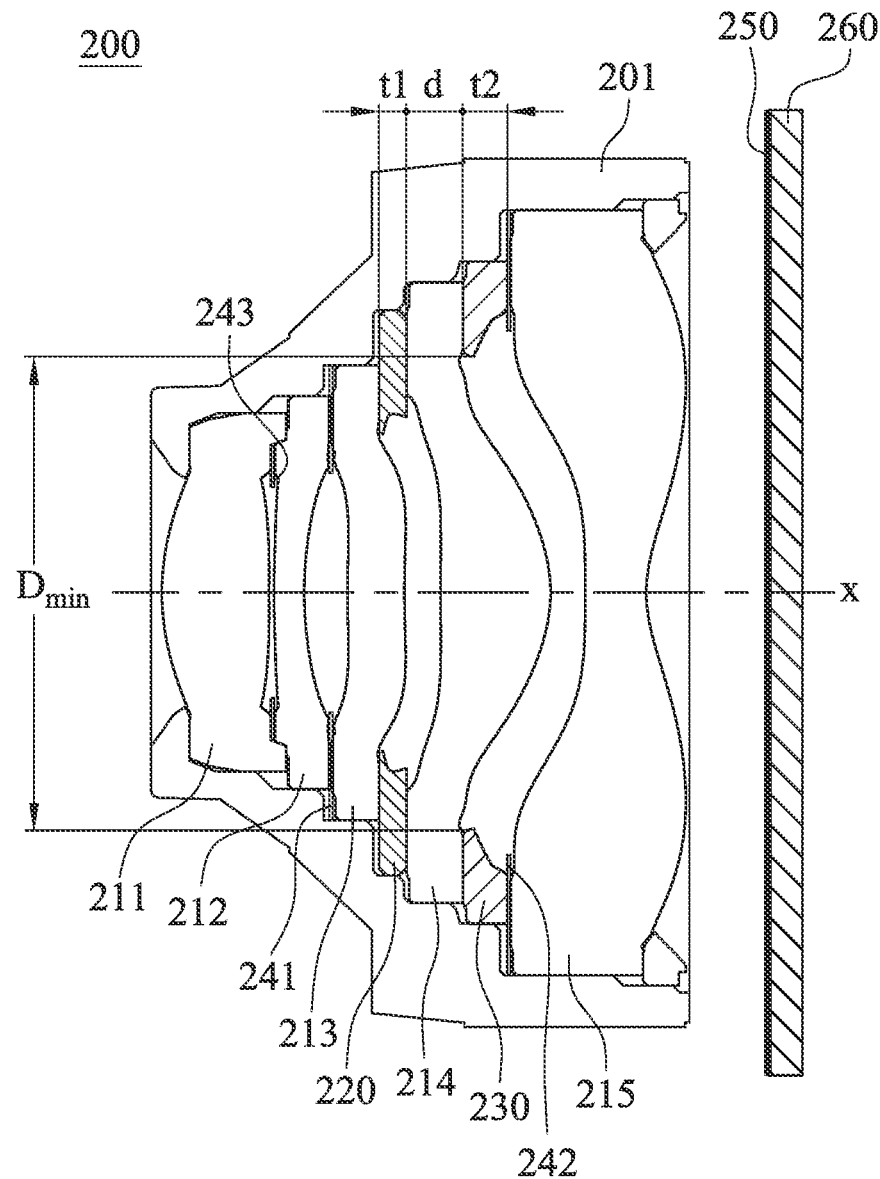
FIG. 2C is a schematic view of parameters t1, t2, and d according to the 2nd embodiment of FIG. 2A.

FIG. 2B is a schematic view of a first spacing ring 220 and a second spacing ring 230 according to the 2nd embodiment of FIG. 2A. FIG. 2C is a schematic view of parameters t1, t2, and d according to the 2nd embodiment of FIG. 2A. In FIGS. 2A, 2B and 2C, the electronic device 200 includes a camera module (its reference numeral is omitted) and an image sensor 260, wherein the camera module includes a lens barrel 201 and an imaging lens assembly (its reference numeral is omitted), and the image sensor 260 is disposed on an image surface 250 of the imaging lens assembly.

In detail, the imaging lens assembly includes a plurality of lens elements, a metal spacing structure (its reference numeral is omitted), three blocking sheets 241, 242, 243, and the image surface 250, wherein the lens elements, the metal spacing structure, and the blocking sheets 241, 242, and 243 are disposed in the lens barrel 201, and the image surface 250 is disposed on the image side of the lens barrel 201.

In the 2nd embodiment of FIG. 2A, the lens elements are, in order from the object side to the image side, a first lens element 211, a second lens element 212, a third lens element 213, a plastic lens element 214, and a fifth lens element 215. The metal spacing structure is for maintaining a space between the plastic lens element 214 and the two lens elements adjacent to two sides thereof (that is, the third lens element 213 and the fifth lens element 215).

The metal spacing structure includes, in order from the object side to the image side, the first spacing ring 220 and the second spacing ring 230; that is, it is favorable for maintaining a space between the plastic lens element 214 and the adjacent third lens element 213 by the arrangement of the first spacing ring 220, and is favorable for maintaining a space between the plastic lens element 214 and the adjacent fifth lens element 215 by the arrangement of the second spacing ring 230. In FIG. 2B, the first spacing ring 220 has a first through hole 221, and the second spacing ring 230 has a second through hole 231, wherein the second through hole 231 is larger than the first through hole 221, the first spacing ring 220 is made of metal material and the appearance thereof is black, and the second spacing ring 230 is made of plastic material.

In FIG. 2A, the blocking sheet 241 is disposed between two of the lens elements (that is, the second lens element 212 and the third lens element 213), the blocking sheet 242 is disposed between the second spacing ring 230 and the fifth lens element 215, and the blocking sheet 243 is disposed between the first lens element 211 and the second lens element 212; that is, in the imaging lens assembly of the 2nd embodiment, all of the blocking sheets 241, 242, 243 are not disposed between the first spacing ring 220 and the second spacing ring 230 of the metal spacing structure. More specifically, in the 2nd embodiment, the blocking sheet 241 is disposed on the object side of the first spacing ring 220 and is not directly contacted with the first spacing ring 220.

In FIG. 2B, a cross section of the inner annular surface of the first spacing ring 220 has a V-shaped groove 222 which is tapered in a direction from a position close to the first through hole 221 to a position away from the first through hole 221.

In FIG. 2B, an outer diameter of the first spacing ring 220, an outer diameter of the plastic lens element 214 and an outer diameter of the second spacing ring 230 are different and the outer diameter of the second spacing ring 230 is larger than the outer diameter of the first spacing ring 220 and the outer diameter of the plastic lens element 214, and the outer diameter of the plastic lens element 214 is larger than the outer diameter of the first spacing ring 220. In FIG. 2C, a minimum inner diameter Dmin of the second through hole 231 is larger than an outer diameter of one of the lens elements closest to the object side of the imaging lens assembly. That is, in the 2nd embodiment, the minimum inner diameter Dmin of the second through hole 231 is larger than the outer diameter of the first lens element 211. The minimum inner diameter Dmin of the second through hole 231 is larger than each of outer diameters of the lens elements on the object side of the first spacing ring 220. That is, in the 2nd embodiment, the minimum inner diameter Dmin of the second through hole 231 is larger than the outer diameter of the first lens element 211, an outer diameter of the second lens element 212, and an outer diameter of the third lens element 213.

In FIG. 2C, when a thickness of the first spacing ring 220 is t1 (that is, the thickness of the first spacing ring 220 parallel to an optical axis X), a thickness of the second spacing ring 230 is t2 (that is, the thickness of the second spacing ring 230 parallel to the optical axis X), and a distance between the first spacing ring 220 and the second spacing ring 230 is d (that is, the distance between the first spacing ring 220 and the second spacing ring 230 parallel to the optical axis X), the following conditions of the Table 2 are satisfied:

TABLE 2

| 2nd embodiment | | | |
| --- | --- | --- | --- |
| t1 (mm) | 0.2 | t1/d | 0.49 |
| t2 (mm) | 0.32 | t2/d | 0.78 |
| d (mm) | 0.41 | | |

3rd Embodiment

Figure 3A:
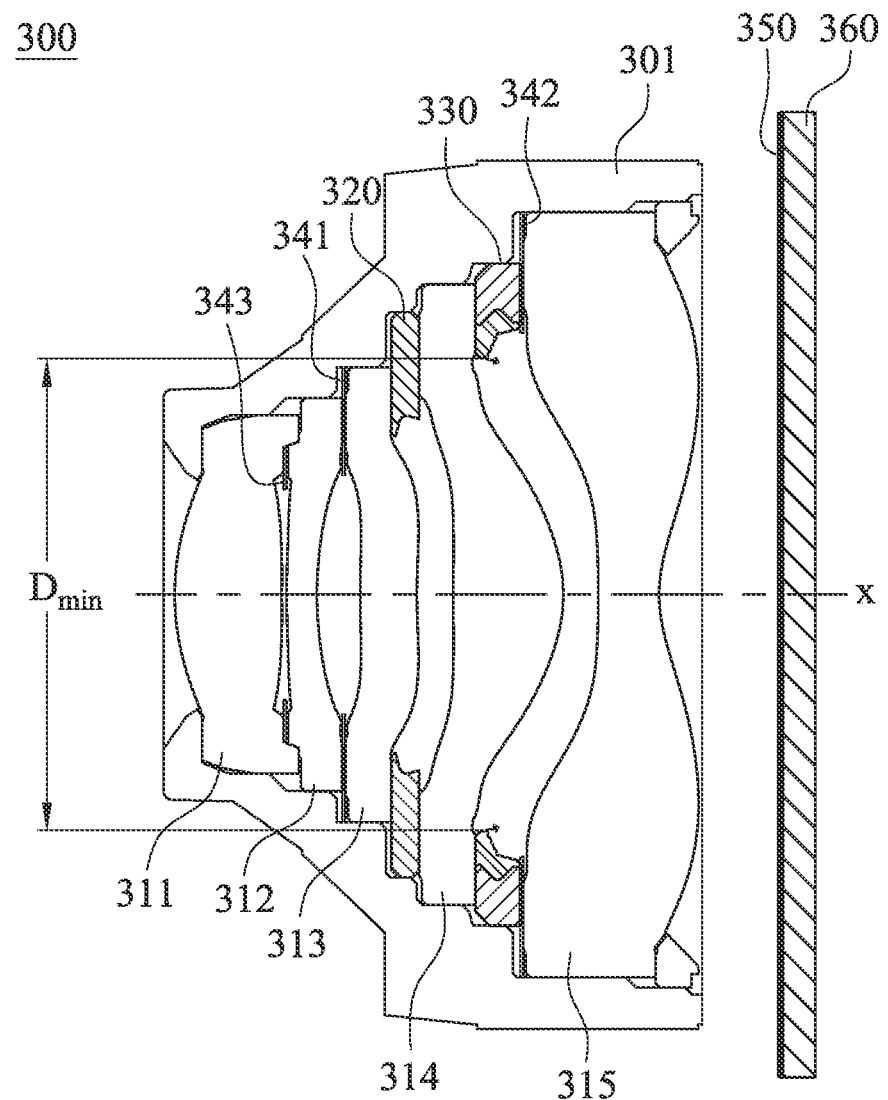
FIG. 3A is a schematic view of an electronic device according to the 3rd embodiment of the present disclosure.
Figure 3B:
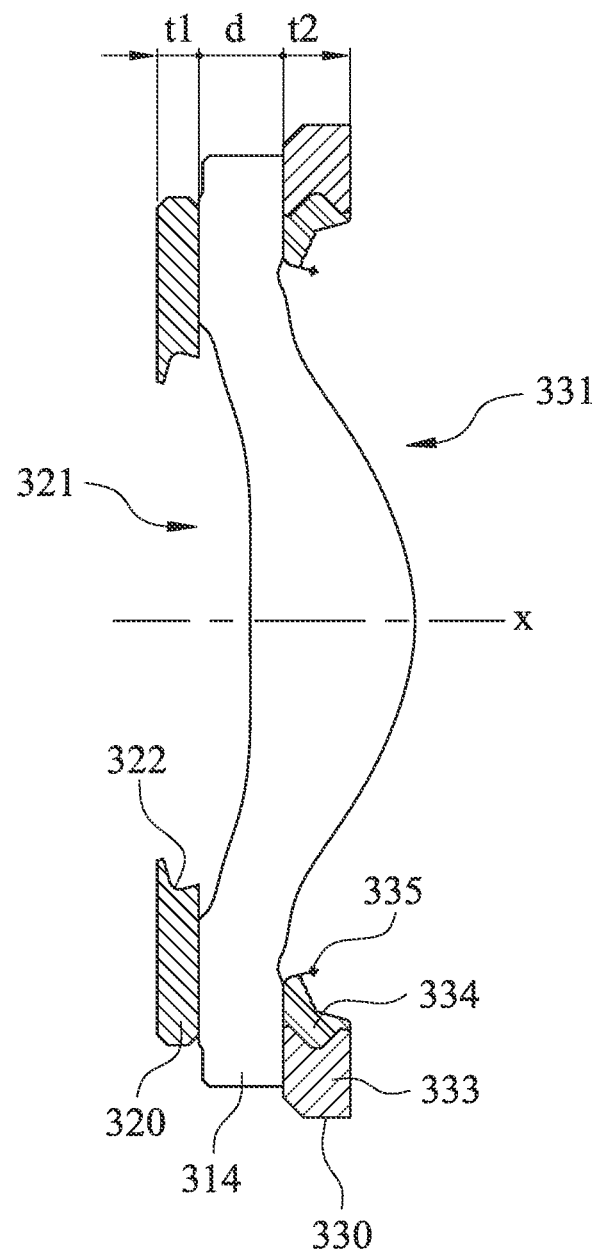
FIG. 3B is a schematic view of a first spacing ring and a second spacing ring according to the 3rd embodiment of FIG. 3A.

FIG. 3A is a schematic view of an electronic device 300 according to the 3rd embodiment of the present disclosure. FIG. 3B is a schematic view of a first spacing ring 320 and a second spacing ring 330 according to the 3rd embodiment of FIG. 3A. In FIGS. 3A and 3B, the electronic device 300 includes a camera module (its reference numeral is omitted) and an image sensor 360, wherein the camera module includes a lens barrel 301 and an imaging lens assembly (its reference numeral is omitted), and the image sensor 360 is disposed on an image surface 350 of the imaging lens assembly.

In detail, the imaging lens assembly includes a plurality of lens elements, a metal spacing structure (its reference numeral is omitted), three blocking sheets 341, 342, 343, and the image surface 350, wherein the lens elements, the metal spacing structure, and the blocking sheets 341, 342, and 343 are disposed in the lens barrel 301, and the image surface 350 is disposed on the image side of the lens barrel 301.

In the 3rd embodiment of FIG. 3A, the lens elements are, in order from the object side to the image side, a first lens element 311, a second lens element 312, a third lens element 313, a plastic lens element 314, and a fifth lens element 315. The metal spacing structure is for maintaining a space between the plastic lens element 314 and the two lens elements adjacent to two sides thereof (that is, the third lens element 313 and the fifth lens element 315).

The metal spacing structure includes, in order from the object side to the image side, the first spacing ring 320 and the second spacing ring 330; that is, it is favorable for maintaining a space between the plastic lens element 314 and the adjacent third lens element 313 by the arrangement of the first spacing ring 320, and is favorable for maintaining a space between the plastic lens element 314 and the adjacent fifth lens element 315 by the arrangement of the second spacing ring 330. In FIG. 3B, the first spacing ring 320 has a first through hole 321, and the second spacing ring 330 has a second through hole 331, wherein the second through hole 331 is larger than the first through hole 321, and the first spacing ring 320 is made of metal material and the appearance thereof is black.

Figure 3C:
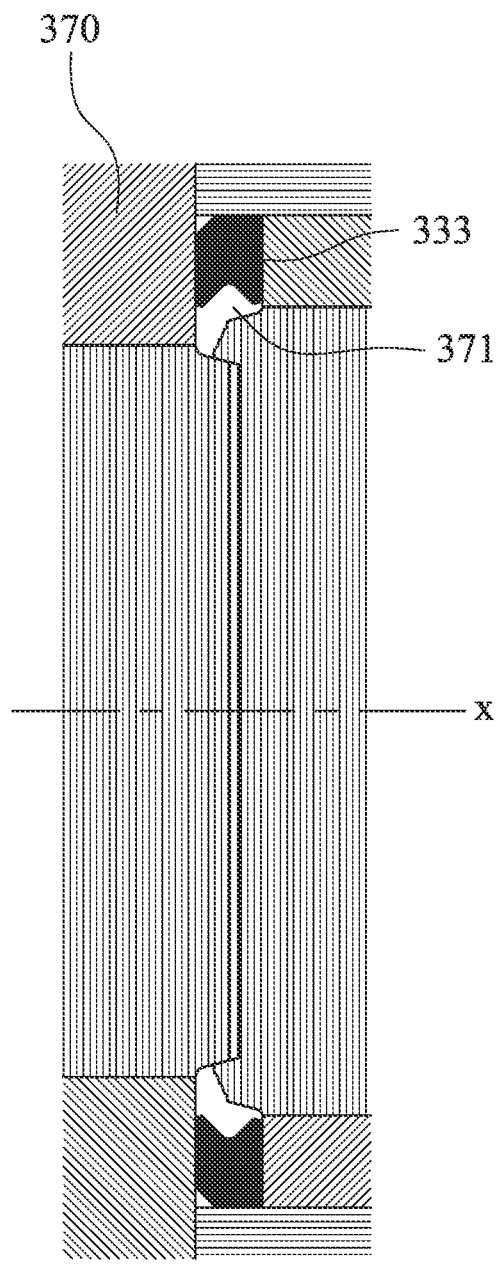
FIG. 3C is a schematic view of a mold for manufacturing the second spacing ring according to the 3rd embodiment of FIG. 3A.

More specifically, in FIG. 3B, the second spacing ring 330 includes a metal material portion 333 and a plastic material portion 334. The metal material portion 333 surrounds the second through hole 331, and the metal material portion 333 of the second spacing ring 330 is directly contacted with the plastic lens element 314 for maintaining the space between one of the two sides of the plastic lens element 314 and one of the two lens elements adjacent to the side which is an image side of the plastic lens element (that is, the fifth lens element 315). The appearance of the plastic material portion 334 is black and surrounds the second through hole 331, and the plastic material portion 334 is closer to the second through hole 331 than the metal material portion 333 is thereto. FIG. 3C is a schematic view of a mold 370 for manufacturing the second spacing ring 330 according to the 3rd embodiment of FIG. 3A. In FIG. 3C, the mold 370 is an injection mold. During the manufacturing process of the second spacing ring 330, the plastic material portion 334 is made by an injection molding method in an injection molding cavity 371, and the metal material portion 333 is embedded in the plastic material portion 334 by the insert molding method. After the manufacturing process is finished, a parting line 335 is formed on the plastic material portion 334.

In FIG. 3A, the blocking sheet 341 is disposed between two of the lens elements (that is, the second lens element 312 and the third lens element 313), the blocking sheet 342 is disposed between the second spacing ring 330 and the fifth lens element 315, and the blocking sheet 343 is disposed between the first lens element 311 and the second lens element 312; that is, in the imaging lens assembly of the 3rd embodiment, both of the blocking sheets 341, 342 are not disposed between the first spacing ring 320 and the second spacing ring 330 of the metal spacing structure. More specifically, in the 3rd embodiment, the blocking sheet 341 is disposed on the object side of the first spacing ring 320 and is not directly contacted with the first spacing ring 320.

In FIG. 3B, a cross section of the inner annular surface of the first spacing ring 320 has a V-shaped groove 322 which is tapered in a direction from a position close to the first through hole 321 to a position away from the first through hole 321.

In FIG. 3A, an outer diameter of the first spacing ring 320, an outer diameter of the plastic lens element 314 and an outer diameter of the second spacing ring 330 are different and the outer diameter of the second spacing ring 330 is larger than the outer diameter of the first spacing ring 320 and the outer diameter of the plastic lens element 314, and the outer diameter of the plastic lens element 314 is larger than the outer diameter of the first spacing ring 320. A minimum inner diameter Dmin of the second through hole 331 is larger than an outer diameter of one of the lens elements closest to the object side of the imaging lens assembly. That is, in the 3rd embodiment, the minimum inner diameter Dmin of the second through hole 331 is larger than an outer diameter of the first lens element 311. The minimum inner diameter Dmin of the second through hole 331 is larger than each of outer diameters of the lens elements on the object side of the first spacing ring 320. That is, in the 3rd embodiment, the minimum inner diameter Dmin of the second through hole 331 is larger than the outer diameter of the first lens element 311, an outer diameter of the second lens element 312, and an outer diameter of the third lens element 313.

In FIG. 3B, when a thickness of the first spacing ring 320 is t1 (that is, the thickness of the first spacing ring 320 parallel to an optical axis X), a thickness of the second spacing ring 330 is t2 (that is, the thickness of the second spacing ring 330 parallel to the optical axis X), and a distance between the first spacing ring 320 and the second spacing ring 330 is d (that is, the distance between the first spacing ring 320 and the second spacing ring 330 parallel to the optical axis X), the following condition of the Table 3 is satisfied:

TABLE 3

| | 3rd embodiment | | |
|---|---|---|---|
| t1 (mm) | 0.2 | t1/d | 0.49 |
| t2 (mm) | 0.32 | t2/d | 0.78 |
| d (mm) | 0.41 | | |

4th Embodiment

Figure 4A:
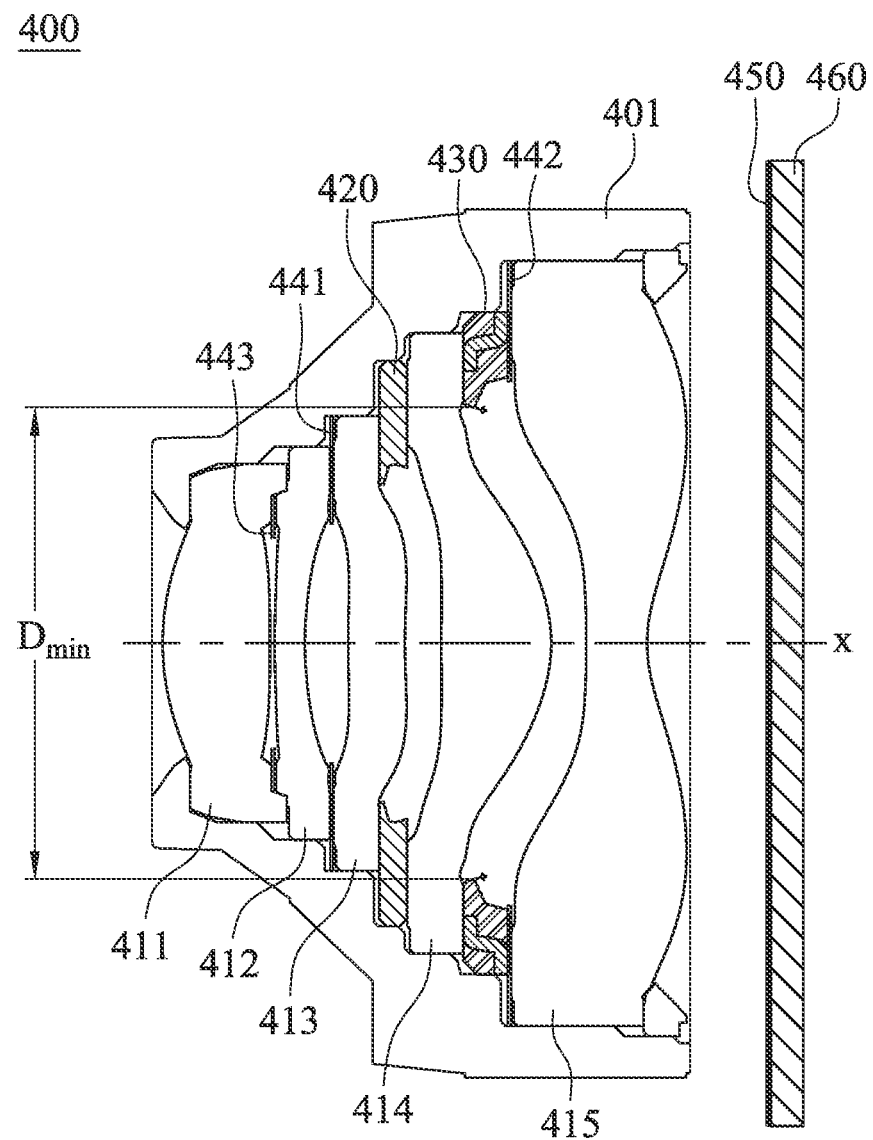
FIG. 4A is a schematic view of an electronic device according to the 4th embodiment of the present disclosure.
Figure 4B:
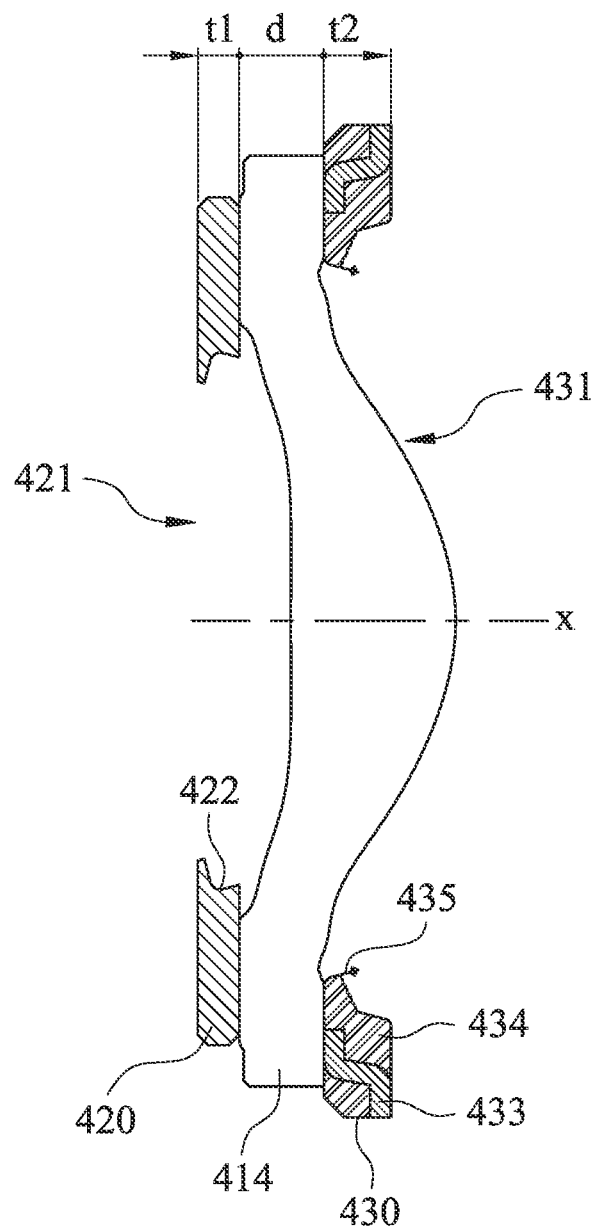
FIG. 4B is a schematic view of a first spacing ring and a second spacing ring according to the 4th embodiment of FIG. 4A.

FIG. 4A is a schematic view of an electronic device 400 according to the 4th embodiment of the present disclosure. FIG. 4B is a schematic view of a first spacing ring 420 and a second spacing ring 430 according to the 4th embodiment of FIG. 4A. In FIGS. 4A and 4B, the electronic device 400 includes a camera module (its reference numeral is omitted) and an image sensor 460, wherein the camera module includes a lens barrel 401 and an imaging lens assembly (its reference numeral is omitted), and the image sensor 460 is disposed on an image surface 450 of the imaging lens assembly.

In detail, the imaging lens assembly includes a plurality of lens elements, a metal spacing structure (its reference numeral is omitted), three blocking sheets 441, 442, 443, and an image surface 450, wherein the lens elements, the metal spacing structure, and the blocking sheets 441, 442, and 443 are disposed in the lens barrel 401, and the image surface 450 is disposed on the image side of the lens barrel 401.

In the 4th embodiment of FIG. 4A, the lens elements are, in order from the object side to the image side, a first lens element 411, a second lens element 412, a third lens element 413, a plastic lens element 414 and a fifth lens element 415. The metal spacing structure is for maintaining a space between the plastic lens element 414 and the two lens elements adjacent to two sides thereof (that is, the third lens element 413 and the fifth lens element 415).

The metal spacing structure includes, in order from the object side to the image side, the first spacing ring 420 and the second spacing ring 430; that is, it is favorable for maintaining a space between the plastic lens element 414 and the adjacent third lens element 413 by the arrangement of the first spacing ring 420, and is favorable for maintaining a space between the plastic lens element 414 and the adjacent fifth lens element 415 by the arrangement of the second spacing ring 430. In FIG. 4B, the first spacing ring 420 has a first through hole 421, and the second spacing ring 430 has a second through hole 431, wherein the second through hole 431 is larger than the first through hole 421, and the first spacing ring 420 is made of metal material and the appearance thereof is black.

More specifically, in FIG. 4B, the second spacing ring 430 includes a metal material portion 433 and a plastic material portion 434. The metal material portion 433 surrounds the second through hole 431, and the metal material portion 433 of the second spacing ring 430 is directly contacted with the plastic lens element 414 for maintaining the space between one of the two sides of the plastic lens element 414 and one of the two lens elements adjacent to the side which is an image side of the plastic lens element 414 (that is, the fifth lens element 415). The appearance of the plastic material portion 434 is black and surrounds the second through hole 431; more specifically, the plastic material portion 434 is a black PC embedding in the metal material portion 433. Moreover, a portion of the plastic material portion 434 is closer to the second through hole 431 than the metal material portion 433 is thereto. After being demolded, a parting line 435 is formed on the plastic material portion 434.

In FIG. 4A, the blocking sheet 441 is disposed between two of the lens elements (that is, the second lens element 412 and the third lens element 413), the blocking sheet 442 is disposed between the second spacing ring 430 and the fifth lens element 415, and the blocking sheet 443 is disposed between the first lens element 411 and the second lens element 412; more specifically, in the imaging lens assembly of the 4th embodiment, all of the blocking sheets 441, 442, 443 are not disposed between the first spacing ring 420 and the second spacing ring 430 of the metal spacing structure. More specifically, in the 4th embodiment, the blocking sheet 441 is disposed on the object side of the first spacing ring 420 and is not directly contacted with the first spacing ring 420.

In FIG. 4B, a cross section of the inner annular surface of the first spacing ring 420 has a V-shaped groove 422 which is tapered in a direction from a position close to the first through hole 421 to a position away from the first through hole 421.

In FIG. 4A, an outer diameter of the first spacing ring 420, an outer diameter of the plastic lens element 414 and an outer diameter of the second spacing ring 430 are different and the outer diameter of the second spacing ring 430 is larger than the outer diameter of the first spacing ring 420 and the outer diameter of the plastic lens element 414, and the outer diameter of the plastic lens element 414 is larger than the outer diameter of the first spacing ring 420. A minimum inner diameter Dmin of the second through hole 431 is larger than an outer diameter of one of the lens elements closest to the object side of the imaging lens assembly. That is, in the 4th embodiment, the minimum inner diameter Dmin of the second through hole 431 is larger than an outer diameter of the first lens element 411. The minimum inner diameter Dmin of the second through hole 431 is larger than the each of the outer diameters of the lens elements on the object side of the first spacing ring 420. That is, in the 4th embodiment, the minimum inner diameter Dmin of the second through hole 431 is larger than the outer diameter of the first lens element 411, an outer diameter of the second lens element 412, and an outer diameter of the third lens element 413.

In FIG. 4B, when a thickness of the first spacing ring 420 is t1 (that is, the thickness of the first spacing ring 420 parallel to an optical axis X), a thickness of the second spacing ring 430 is t2 (that is, the thickness of the second spacing ring 430 parallel to the optical axis X), and a distance between the first spacing ring 420 and the second spacing ring 430 is d (that is, the distance between the first spacing ring 420 and the second spacing ring 430 parallel to the optical axis X), the following conditions of the Table 4 are satisfied:

TABLE 4

| 4th embodiment | | | |
|---|---|---|---|
| t1 (mm) | 0.2 | t1/d | 0.49 |
| t2 (mm) | 0.32 | t2/d | 0.78 |
| d (mm) | 0.41 | | |

5th Embodiment

Figure 5A:
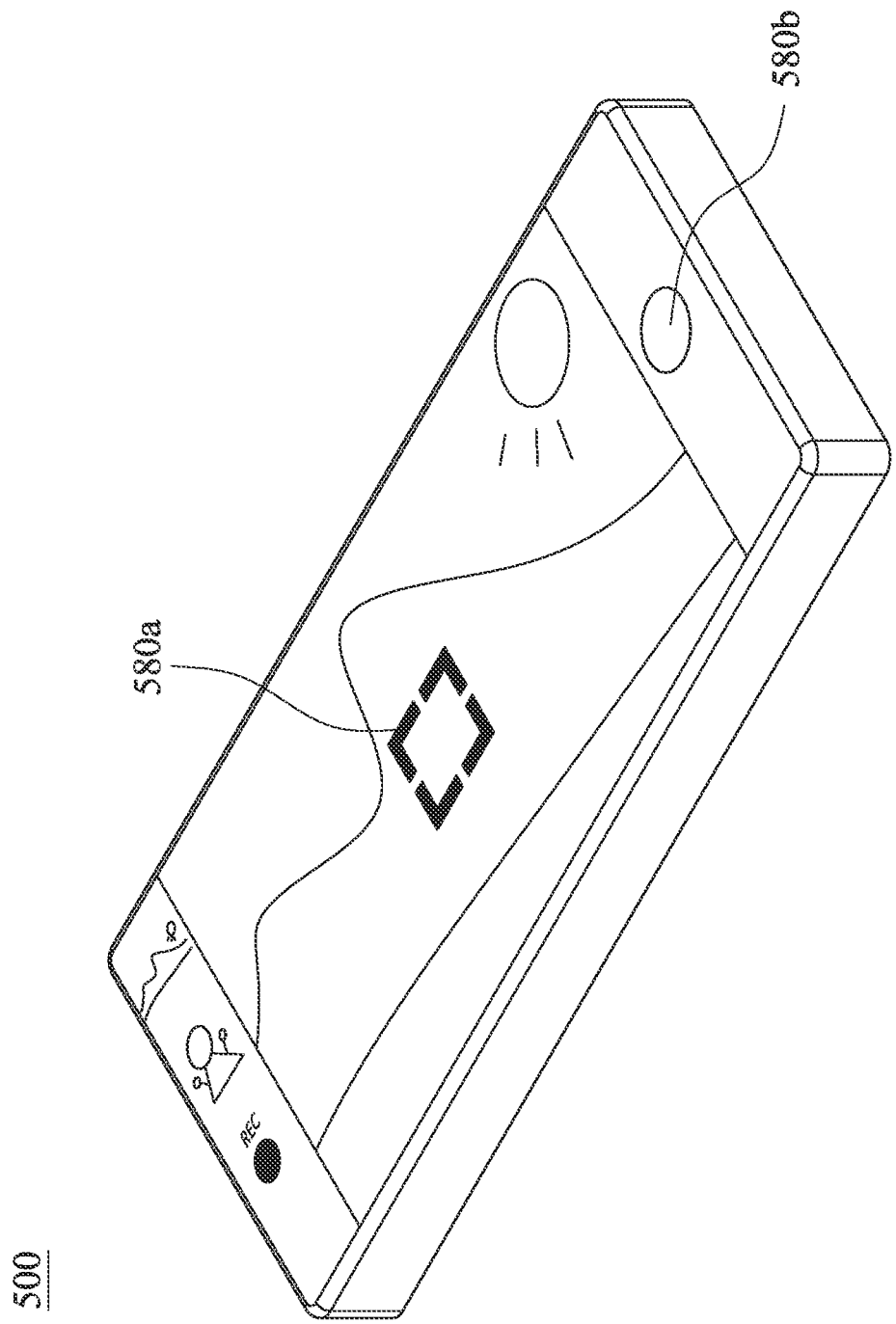
FIG. 5A is a schematic view of an electronic device according to the 5th embodiment of the present disclosure.
Figure 5B:
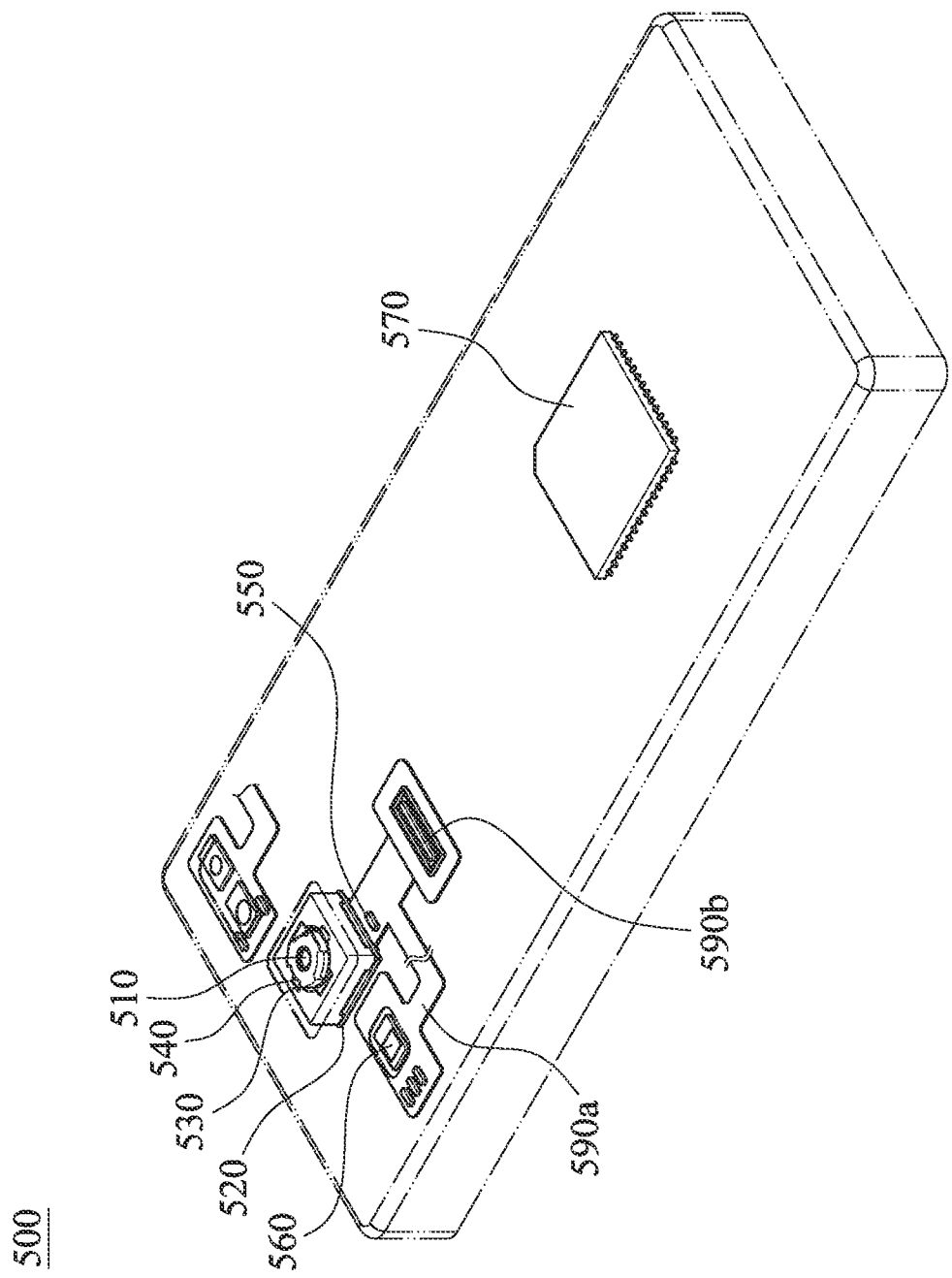
FIG. 5B is another schematic view of the electronic device according to the 5th embodiment of FIG. 5A.

FIG. 5A is a schematic view of an electronic device 500 according to the 5th embodiment of the present disclosure. FIG. 5B is another schematic view of the electronic device 500 according to the 5th embodiment of FIG. 5A. In FIGS. 5A and 5B, the electronic device 500 is a smart phone according to the 5th embodiment. The electronic device 500 includes a camera module 510 according to the present disclosure and an image sensor 520, wherein the camera module 510 can be any one of the camera modules of the aforementioned embodiments, and the camera module 510 includes an imaging lens assembly, wherein the imaging lens assembly can be any one of the aforementioned embodiments, but is not limited thereto. The image sensor 520 is disposed on an image surface (not shown) of the imaging lens assembly of the camera module 510. Therefore, it is favorable for satisfying requirements of the mass production and the appearance of the camera module applied to the electronic device nowadays.

Specifically, the user activates the capturing mode via the user interface 580 of the electronic device 500, wherein the user interface 580 of the 5th embodiment can be a touch screen 580a, a button 580b, etc. At this moment, the camera module 510 collects imaging light on the image sensor 520 and outputs electronic signals associated with images to an image signal processor (ISP) 570.

Figure 5C:
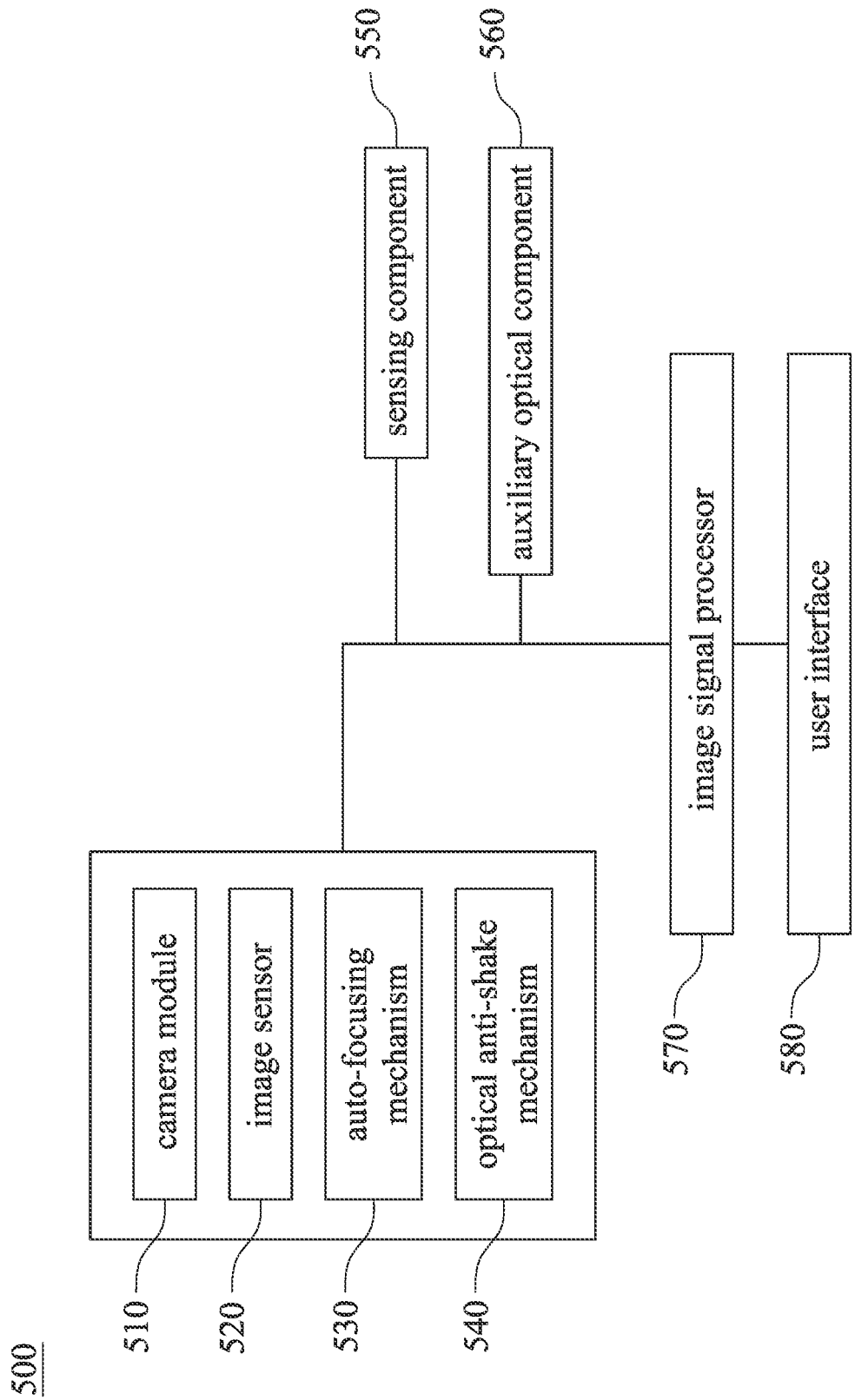
FIG. 5C is a block diagram of the electronic device according to the 5th embodiment of FIG. 5A.

FIG. 5C is a block diagram of the electronic device 500 according to the 5th embodiment of FIG. 5A, especially a block diagram of the electronic device 500. In FIGS. 5A to 5C, the electronic device 500 can further include an auto-focusing mechanism 530 and optical anti-shake mechanism 540 in response to the camera specifications of the electronic device 500, moreover, the electronic device 500 can further include at least one auxiliary optical component 560 and at least one sensing component 550. The auxiliary optical component 560 can be a flash module for compensating color temperature, an infrared distance measurement component, a laser focus module, etc. The sensing component 550 can have functions for sensing physical momentum and kinetic energy, such as an accelerator, a gyroscope, a Hall Effect Element, to sense shaking or jitters applied by hands of the user or external environments. Accordingly, the auto-focusing mechanism 530 and the optical anti-shake mechanism 540 of the electronic device 500 can be enhanced to achieve the superior image quality. Furthermore, the electronic device 500 according to the present disclosure can have a capturing function with multiple modes, such as taking optimized selfies, high dynamic range (HDR) under a low light condition, 4K resolution recording, etc. Furthermore, the user can visually see a captured image of the camera through the touch screen and manually operate the view finding range on the touch screen to achieve the autofocus function of what you see is what you get.

Moreover, in FIG. 5B, the camera module 510, the image sensor 520, the auto-focusing mechanism 530, the optical anti-shake mechanism 540, the sensing component 550 and the auxiliary optical component 560 can be disposed on a flexible printed circuitboard (FPC) 590a and electrically connected to the associated elements, such as the image signal processor 570, via a connector 590b to perform a capturing process. Since the current electronic devices, such as smartphones, have a tendency of being light and thin, the way of firstly disposing the camera module, the imaging lens assembly and related elements on the flexible printed circuitboard and secondly integrating the circuit into the main board of the electronic device via the connector can satisfy the mechanical design of the limited space inside the electronic device and the layout requirements and obtain more margins. The auto focus function of the imaging lens module can be more flexibly controlled via the touch screen of the electronic device. In the 5th embodiment, the electronic device 500 can include a plurality of sensing components 550 and a plurality of auxiliary optical components 560. The sensing components 550 and the auxiliary optical components 560 are disposed on the flexible printed circuitboard 590a and at least one other flexible printed circuitboard (its reference numeral is omitted) and electrically connected to the associated elements, such as the image signal processor 570, via corresponding connectors to perform a capturing process. In other embodiments (not shown), the sensing elements and the auxiliary optical elements can also be disposed on the main board of the electronic device or carrier boards in other forms according to requirements of the mechanical design and the circuit layout.

Furthermore, the electronic device 500 can further include, but not be limited to, a display, a control unit, a storage unit, a random access memory (RAM), a read-only memory (ROM), or the combination thereof.

6th Embodiment

FIG. 6 shows a schematic view of an electronic device 600 according to the 6th embodiment of the present disclosure. The electronic device 600 of the 6th embodiment is a tablet. The electronic device 600 includes a camera module 610 according to the present disclosure and an image sensor (not shown), wherein the camera module 610 includes an imaging lens assembly of the present disclosure, wherein the image sensor is disposed on the image surface (not shown) of the imaging lens assembly of the camera module 610.

7th Embodiment

Figure 7:
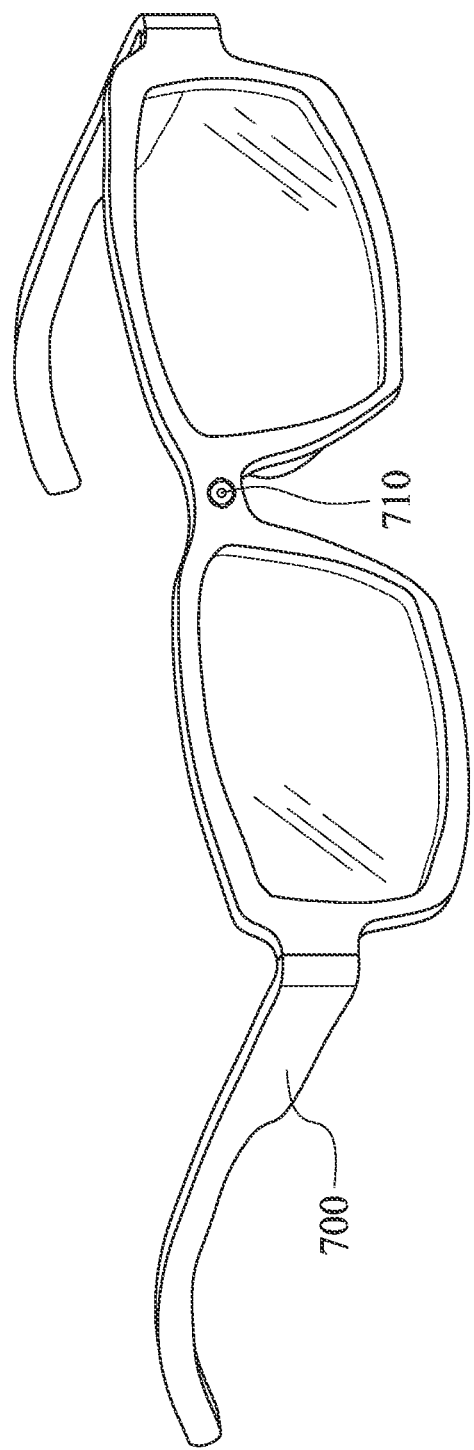
FIG. 7 is a schematic view of an electronic device according to the 7th embodiment of the present disclosure.

FIG. 7 shows a schematic view of an electronic device 700 according to the 7th embodiment of the present disclosure. In FIG. 7, the electronic device 700 of the 7th embodiment is a wearable device. The electronic device 700 includes a camera module 710 according to the present disclosure and an image sensor (not shown), wherein the camera module 710 includes an imaging lens assembly (not shown) of the present disclosure, and the image sensor is disposed on the image surface (not shown) of the camera module 710.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising:
   a plurality of lens elements, wherein at least one of the lens elements is a plastic lens element;
   a metal spacing structure for maintaining the plastic lens element in a space between two sides thereof and two of the lens elements adjacent thereto, respectively, and the metal spacing structure comprising, in order from an object side to an image side:
   a first spacing ring having a first through hole; and
   a second spacing ring having a second through hole, wherein the second through hole is larger than the first through hole, at least one of the first spacing ring and the second spacing ring is made of metal material, and the second spacing ring comprises:
      a metal material portion surrounding the second through hole, wherein the metal material portion of the second spacing ring is directly contacted with the plastic lens element for maintaining the space between one of the two sides of the plastic lens element and one of the two lens elements adjacent to the side which is an image side of the plastic lens element; and
      a plastic material portion, wherein an appearance of the plastic material portion is black, the plastic material portion surrounds the second through hole, and the plastic material portion is closer to the second through hole than the metal material portion is thereto;
   wherein a thickness of the second spacing ring is t2, a distance between the first spacing ring and the second spacing ring is d, and the following condition is satisfied:

$0.5 < t2/d < 2.0$.

2. The imaging lens assembly of claim 1, wherein the first spacing ring is made of metal material and an appearance of the first spacing ring is black.

3. The imaging lens assembly of claim 2, wherein a cross section of an inner annular surface of the first spacing ring is a V-shaped groove which is tapered in a direction from a position close to the first through hole to a position away from the first through hole.

4. The imaging lens assembly of claim 2, wherein a thickness of the first spacing ring is t1, the distance between the first spacing ring and the second spacing ring is d, and the following condition is satisfied:

$0.1 < t1/d < 1.3$.

5. The imaging lens assembly of claim 1, wherein an outer diameter of the first spacing ring, an outer diameter of the plastic lens element and an outer diameter of the second spacing ring are different, and the outer diameter of the second spacing ring is larger than the outer diameter of the first spacing ring and the outer diameter of the plastic lens element, the outer diameter of the plastic lens element is larger than the outer diameter of the first spacing ring.

6. The imaging lens assembly of claim 5, wherein the at least one blocking sheet is disposed on an object side of the first spacing ring and is not directly contacted with the first spacing ring.

7. The imaging lens assembly of claim 1, wherein the metal material portion is embedded in the plastic material portion by an insert molding method.

8. The imaging lens assembly of claim 1, wherein both of the first spacing ring and the second spacing ring are made of metal material and appearances of the first spacing ring and the second spacing ring are black.

9. The imaging lens assembly of claim 8, wherein a cross section of the inner annular surface of the second spacing ring is a V-shaped groove which is tapered in a direction from a position close to the second through hole to a position away from the second through hole.

10. The imaging lens assembly of claim 9, wherein a minimum inner diameter of the second through hole is larger than an outer diameter of one of the lens elements closest to the object side of the imaging lens assembly.

11. The imaging lens assembly of claim 10, wherein a minimum inner diameter of the second through hole is larger than each of outer diameters of the lens elements on an object side of the first spacing ring.

12. A camera module, comprising:
the imaging lens assembly of claim 1.

13. An electronic device, comprising:
the camera module of claim 12; and
an image sensor disposed on an image surface of the imaging lens assembly of the camera module.

\* \* \* \* \*